Aug. 22, 1939.　　　M. E. MARTELLOTTI　　　2,170,291
TRANSMISSION AND CONTROL MECHANISM FOR MILLING MACHINES
Filed Sept. 9, 1938　　　6 Sheets-Sheet 1
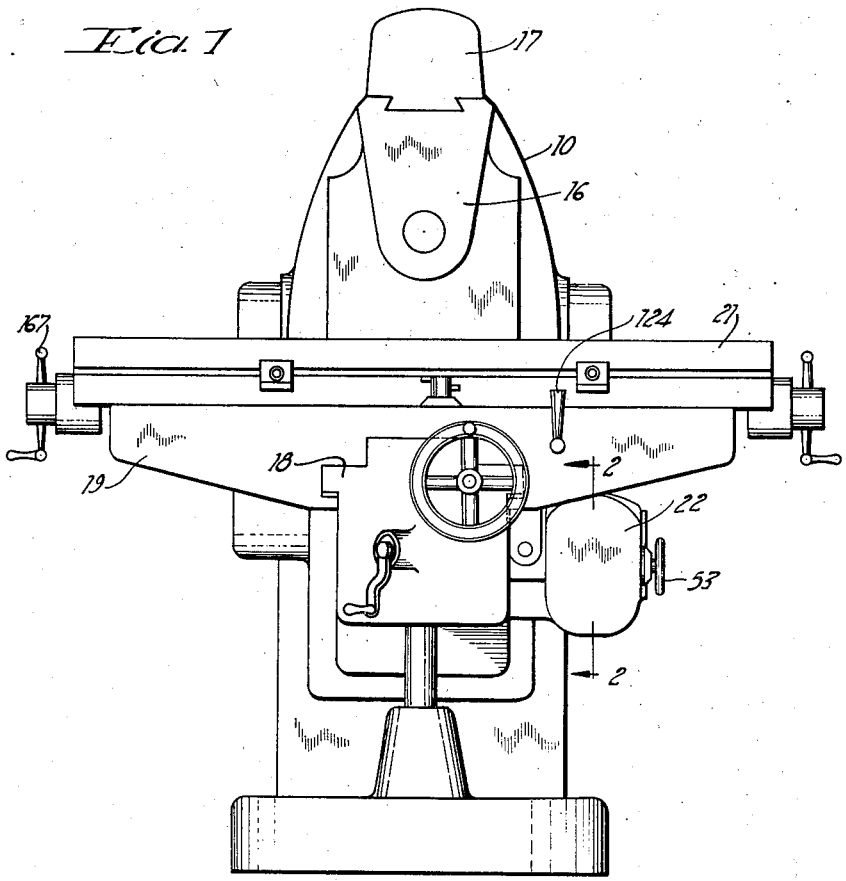
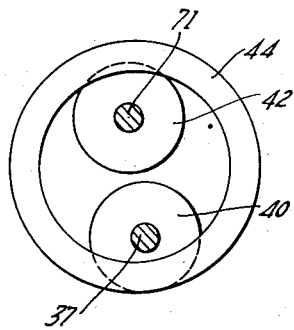
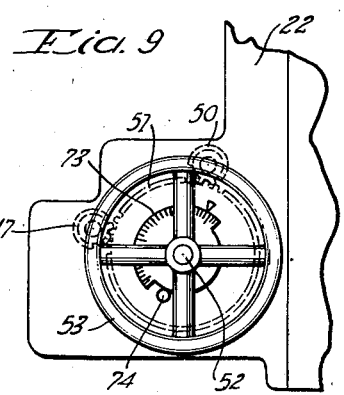
INVENTOR.
MARIO E. MARTELLOTTI
BY
ATTORNEY.

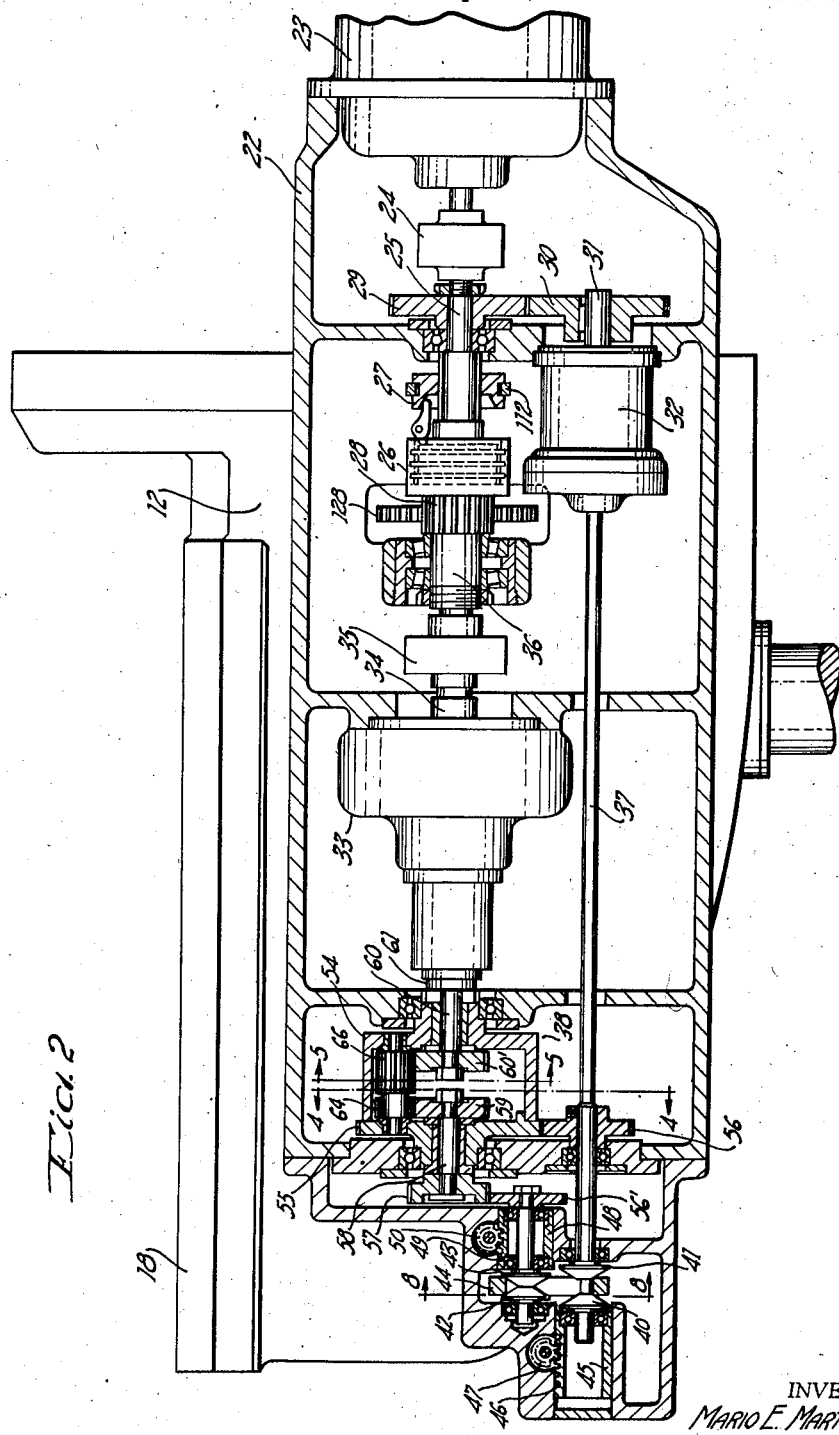

Aug. 22, 1939.   M. E. MARTELLOTTI   2,170,291
TRANSMISSION AND CONTROL MECHANISM FOR MILLING MACHINES
Filed Sept. 9, 1938   6 Sheets-Sheet 3

INVENTOR.
MARIO E. MARTELLOTTI
BY
A. K. Parsons
ATTORNEY.

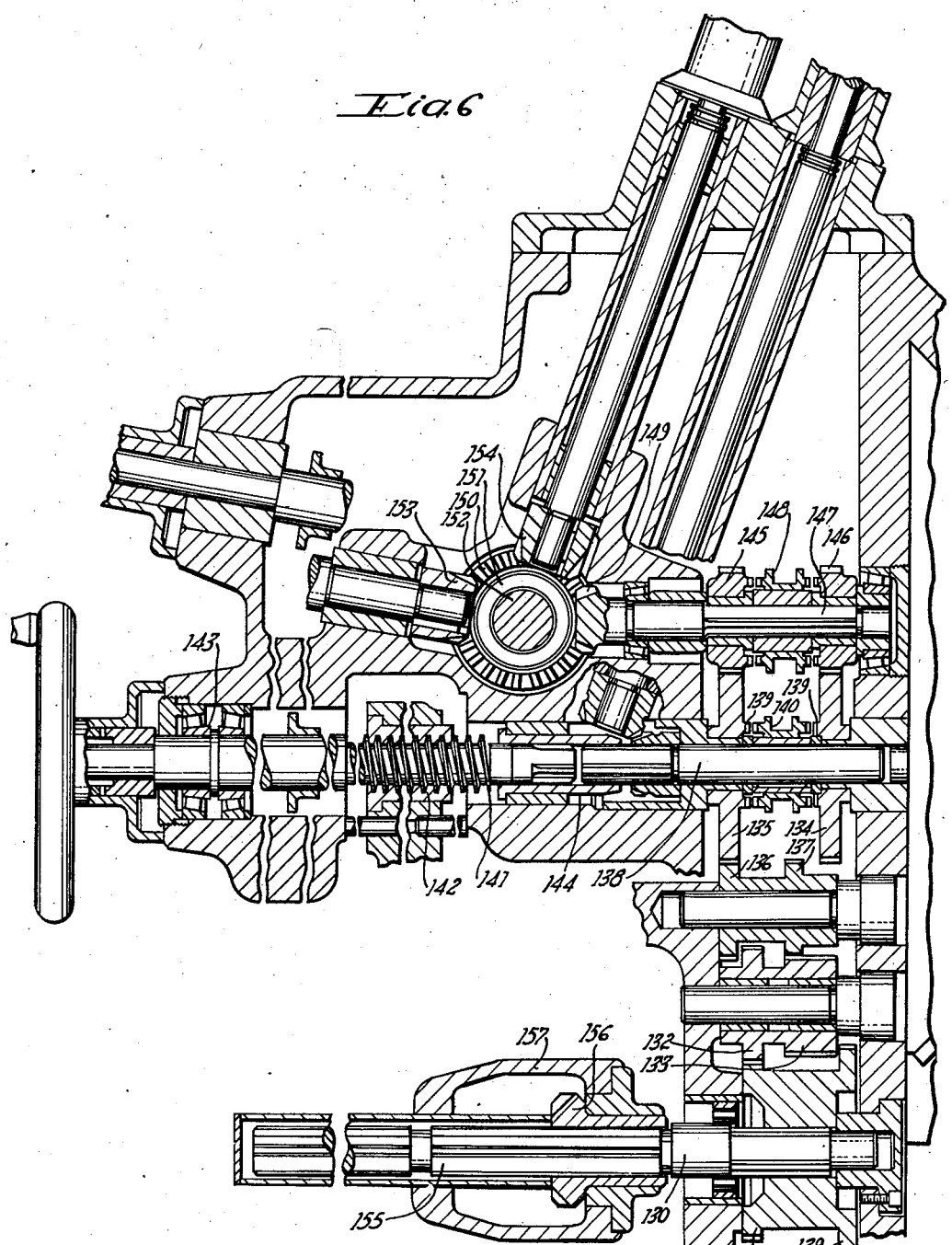

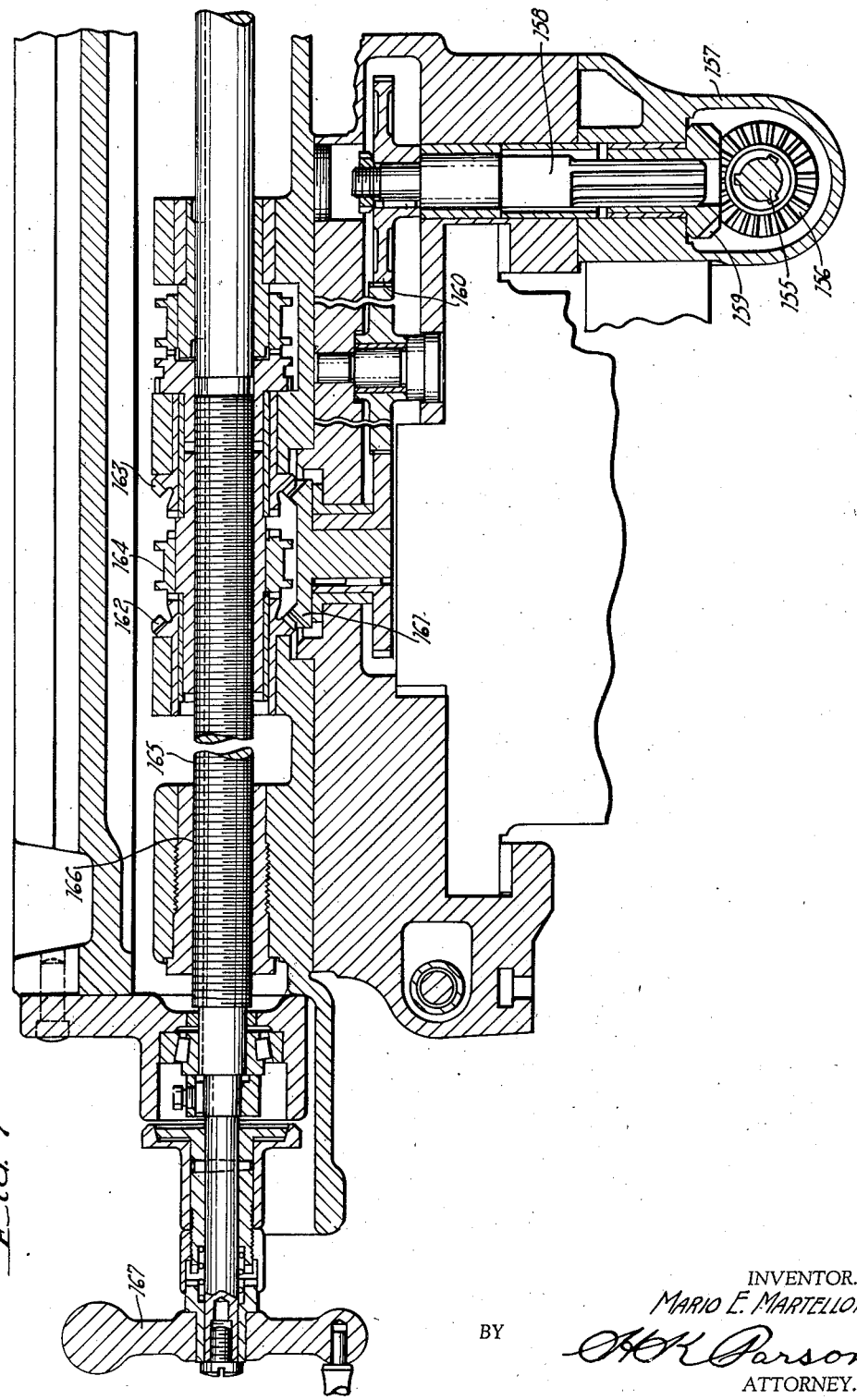

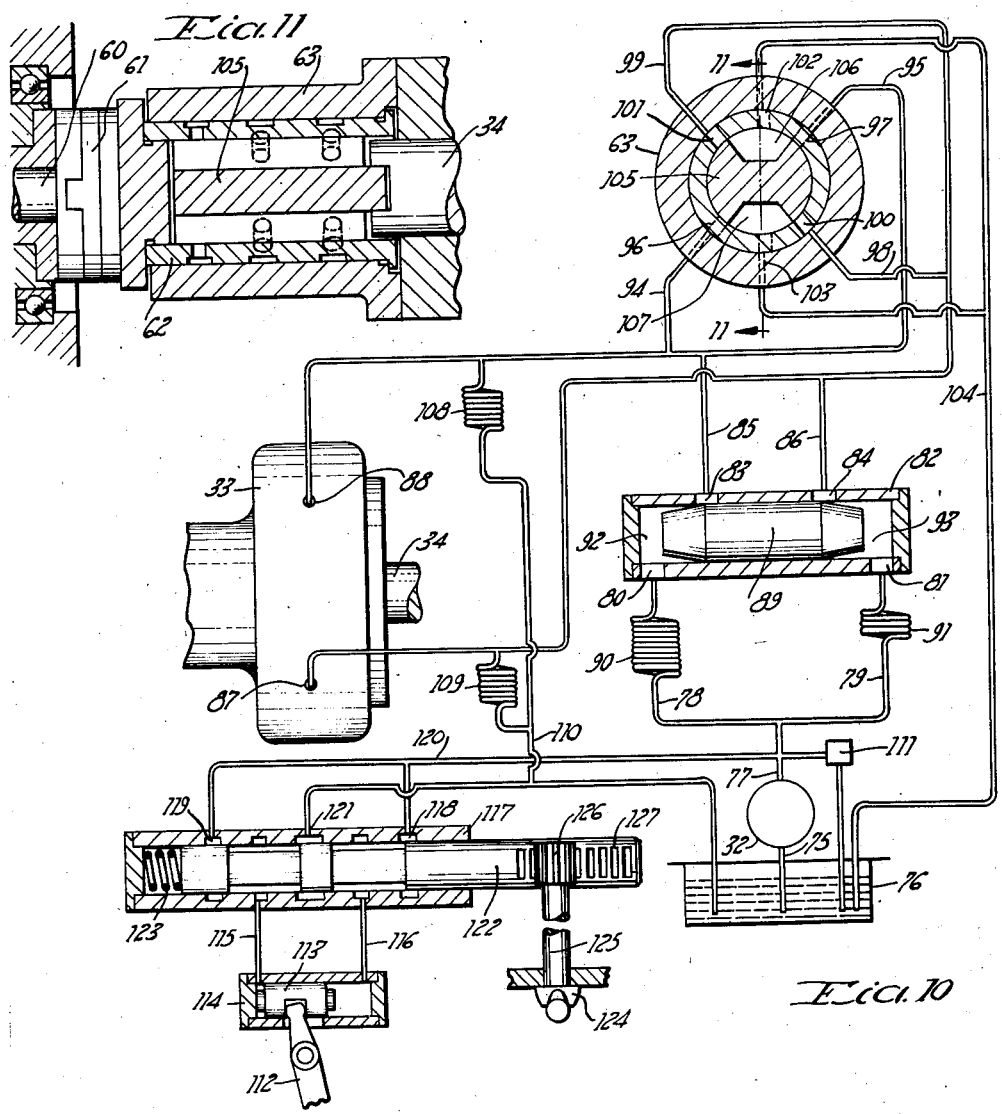

Patented Aug. 22, 1939

2,170,291

UNITED STATES PATENT OFFICE 2,170,291

TRANSMISSION AND CONTROL MECHANISM FOR MILLING MACHINES

Mario E. Martellotti, Cincinnati, Ohio, assignor to The Cincinnati Milling Machine Co., Cincinnati, Ohio, a corporation of Ohio Application September 9, 1938, Serial No. 229,139

9 Claims. (Cl. 90—21)

This invention relates to machine tools and more particularly to an improved transmission and control mechanism that is especially adaptable for milling machines.

One of the objects of this invention is to provide a feed transmission which has greater versatility with respect to rate yield than present transmissions.

Another object of this invention is to provide a transmission which is relatively light and compact in construction so that it may be placed on the machine in closer relation to the parts to be actuated, and thus reduce the number of sliding connections and generally improve the efficiency of the machine.

A further object of this invention is to so contrive a feed and rapid traverse transmission that only a few simple controls are necessary to govern its operation.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1 is a front elevation of a machine tool embodying the principles of this invention.

Figure 2 is a section through the transmission casing as viewed on line 2—2 of Figure 1.

Figure 6 is an expanded view showing the branch trains operated by the transmission for actuating the saddle and knee of the machine.

Figure 7 is a sectional view through the saddle showing the branch train for actuating the table.

Figure 8 is a detailed section on the line 8—8 of Figure 2.

Figure 9 is a detail view on the feed rate variator control wheel.

Figure 10 is a diagrammatic view of the hydraulic circuit.

Figure 11 is a detail section through the servo-control valve as viewed on line 11—11 of Figure 10.

Figure 3:
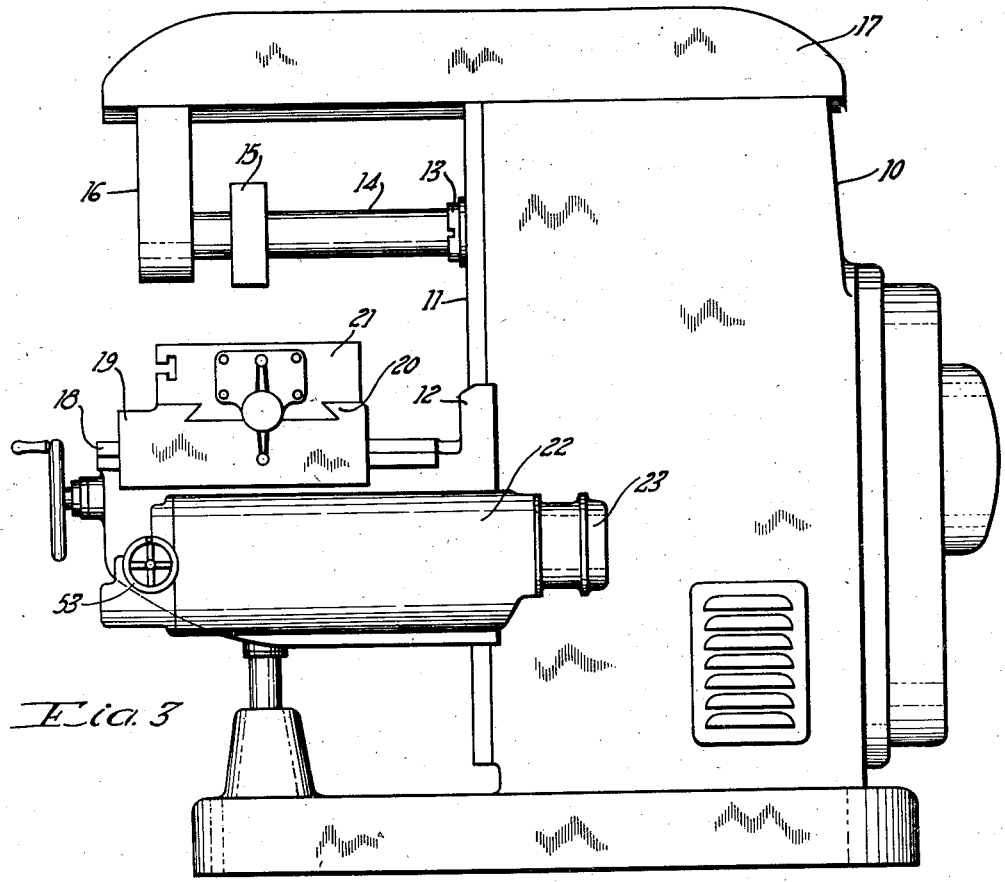
Figure 3 is a side elevation of the machine shown in Figure 1.

Referring to Figures 1 and 3 of the drawings the reference numeral 10 indicates the column of a milling machine on the front face of which are guideways 11 for receiving a vertically movable knee 12. A cutter spindle 13 is journaled in the column for driving an arbor 14 and supported cutter 15. The outer end of the arbor may be supported by an arbor support 16, depending from an overarm 17 which is adjustably mounted on the top of the overarm 10.

The knee 12 has guide surfaces 18 formed on the top thereof in parallel relation to the axis of the cutter arbor 14 for guiding a saddle 19 for movement parallel to the axis of the arbor. The saddle, in turn, has guideways 20 for receiving a work table 21 which is movable transversely to the axis of the cutter arbor.

It is obvious that provision should be made for traversing the work supporting elements, such as the table, saddle and knee at variable rates depending upon the nature of the machining operation to be performed and this has usually been accomplished by providing a multiple gear feed box in the column of the machine, together with complicated control mechanism for variably positioning the gears to obtain different rates. There are a number of disadvantages in doing this. Regardless of the number of change gears used, the rate can only be varied in steps and the more gears utilized, the heavier and more costly becomes the machine. Furthermore, mounting the feed box in the column necessitates a number of slidable connections in the train leading to the saddle, table and knee before the power can be transmitted to these parts.

This invention contemplates a more compact and independent feed and rapid traverse transmission which is composed of a fewer number of parts and which are lighter in weight, whereby the entire transmission may be mounted on one of the movable work supporting elements, thereby reducing the number of slidable joints which would be necessary between the movable element and the column, thus increasing the overall efficiency of the machine.

In accordance with the foregoing, an independent power unit is mounted in a casing 22 which is located on the side of the knee 12, as shown in Figures 1 and 3 and this power unit contains a variable feed transmission and a rapid traverse transmission which may be selectively connected by means to be described for actuation of the table, saddle or knee. A prime mover, independent of the prime mover for actuating the spindle, is mounted on the end of the casing consisting of an electric motor 23.

Referring to Figure 2, the armature shaft of the motor is connected by an Oldham coupling 24 for continuous actuation of a drive shaft 25. This shaft rotates one-half of the clutch plates of a multiple disc clutch 26. This clutch is operated by a shifter 27 and when moved to the left, as viewed in Figure 2, it serves to connect shaft 25 for rotation of a common drive gear 28 at a rapid traverse rate.

The shaft 25 also drives a gear 29 which intermeshes with a gear 30 keyed to the end of a drive shaft 31 for a pump 32. It will be noted that the pump is continuously actuated during actuation of the prime mover. The pump 32 serves to supply fluid under pressure to a rotary hydraulic motor 33 which has its output shaft 34 connected by a free wheeling clutch 35 to shaft 36 which supports the gear 28. The clutch 35 is of such a nature that when the rapid traverse clutch is engaged it will overrun, thus permitting rapid traverse actuation of the gear 28, but when the rapid traverse clutch is disengaged, the feed motor 33 will pick up the drive and rotate the gear 28 at a feed rate.

An infinitely adjustable mechanism has been provided for controlling the rate of rotation of the hydraulic motor, whereby an infinite number of feed rates may be obtained. This mechanism comprises a servo-valve which has one part integrally connected to the motor for feed back purposes, and a second part which is actuated by an infinitely variable branch transmission continuously driven by the prime mover.

The drive for this mechanism is obtained by providing an extension 37 of the pump drive shaft 31. The shaft 37 actuates a rate reduction unit, indicated generally by the reference numeral 38, and an infinitely variable rate variator unit, indicated generally by the reference numeral 39. The feed rate variator consists of a first pair of conical discs 40 and 41, which are rotated by the shaft 37, and a second pair of conical discs 42 and 43 which are driven by the first pair through a rigid friction ring 44 which circumscribes the peripheries of the two sets of discs as more clearly shown in Figure 8. The discs 41 and 42 are fixed against lateral movement, while the discs 40 and 43 are supported for lateral movement so that infinite variation in the rate transmitted by the driving disc to the driven discs may be obtained.

This adjustment is obtained by anti-frictionally supporting the disc 40 for rotation in a sleeve 45 having rack teeth 46 formed on its periphery and engaged by pinion 47. The disc 43 is similarly anti-frictionally supported for rotation in a sleeve 48 having rack teeth 49 formed on the periphery for engagement by a pinion 50. The pinions 47 and 50 extend axially for engagement with a common control gear 51, as shown in Figure 9, supported on a shaft 52 which projects through the casing so as to receive a manually operable hand wheel 53. It will be evident that upon rotation of the wheel 53 in a clockwise direction that the sleeve 45 and the sleeve 48 will move toward the right as viewed in Figure 2, thereby causing the disc 40 to approach the disc 41, increasing the effective diameter of the driving discs, while the disc 43 will recede from the disc 42, decreasing the effective diameter of the driven discs whereby the output rate will be increased. Rotation of the hand wheel 53 in a counterclockwise direction will, of course, produce the opposite effect and decrease the rate transmitted.

Figure 4:
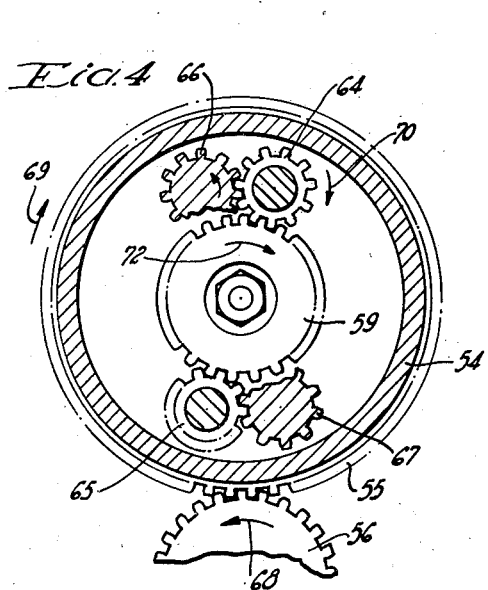
Figure 4 is an enlarged detailed section as viewed on the line 4—4 of Figure 2.
Figure 5:
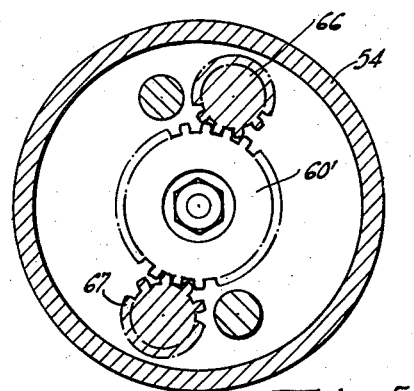
Figure 5 is an enlarged detail section taken on the line 5—5 of Figure 2.

It will be noted that the shaft 37 is driven at practically a one to one ratio with the prime mover and that this rate is too fast to be reduced by the single rate varying unit for slow feed rates. Therefore, the rate reduction unit 38 has been provided and this unit has a fixed reduction ratio for connecting the output of the rate variator to the servo-control valve of the motor. This unit comprises a carrier 54 which has an integral gear 55 meshing with a spur gear 56, keyed to the shaft 37. The output gear 56' of the rate variator drives a gear 57 secured to a shaft 58 which passes through the axis of the carrier and has a gear 59 fixed to the other end thereof. A second shaft 60 in co-axial alignment with the shaft 58 has a gear 60' fixed to one end, and an Oldham coupling 61 mounted on the other end by which the shaft 60 is connected to the outside member 62 of a servo-valve indicated generally by the reference numeral 63 as shown in Figure 11. The carrier 54 carries a first pair of diametrically opposite planetary gears 64 and 65 which mesh with the sun gear 59, as shown in Figure 4, and a second pair of diametrically opposed planetary gears 66 and 67 which mesh with the sun gear 60', as shown in Figure 5. These gears are sufficiently wide that they overlap and intermesh in the unoccupied space between the sun gears, whereby the gears 64 and 65 serve as drivers for the gears 66 and 67, which in turn drive the gear 60'.

Although the shaft 37 rotates at a relatively high speed, such as 1200 R. P. M., the above described mechanism is capable of reducing this speed to a few revolutions per minute which are necessary for obtaining the lowest feed rate. If the gears 56 and 55 have a one to two ratio the carrier will rotate at 600 R. P. M., and in the assumed directions indicated by the arrows 68 and 69 respectively in Figure 4.

If the gear 59 is assumed to be stationary for the moment, the planetary gears 64 and 65 moving with the carrier will be rotated at 1200 R. P. M., since the ratio between the gears 64 and 59 is one to two. The gears 64 and 65 would rotate about their axes in a clockwise direction as indicated by the arrow 70. This would cause counterclockwise rotation of the gears 66 and clockwise rotation of the gear 60'.

But the gear 59 is not stationary, but is being continuously driven by the shaft 37 through the rate changer. Referring to Figure 8, the shaft 37 is indicated as rotating in a counterclockwise direction, or in other words, in the same direction as the gear 56 indicated in Figure 4, which means that the output shaft 71 of the rate changer is rotating in a counterclockwise direction and thus will drive the gear 59 through the gears 56' and 57 in the opposite direction or in a clockwise direction as indicated by the arrow 72 in Figure 4. It will now be obvious that if the carrier 54 is assumed to be stationary for the moment, the gear 59 will rotate the planetary gears 64 and 65 in a counterclockwise direction, or in other words in a direction opposite to the direction of the arrow 70 which indicated the direction of drive effected by the gear 56.

With the rate changer set at a one to two reduction the shaft 37 will rotate the output shaft 71 of the rate changer at 600 R. P. M. and since the gears 56' and 57 have a one to one ratio, the gear 59 will be rotated at 600 R. P. M.

This means that the planetary gears 64 and 65 due to their one to two ratio to the gear 59 will be rotated at 1200 R. P. M., but in a direction opposite to that produced by the carrier whereby the result will be zero rotation. It is thus possible to obtain zero rotation of the gear 60' which drives the servo-valve in spite of the high rate of rotation of the shaft 37. It should now be obvious that by increasing the ratio of the rate variator above one-half, that the rate of rotation of the gear 60' can be gradually increased to provide any desired feed rate and the ratio capacity of the rate variator is sufficient to increase this rate to a desirable practicable limit.

It will be noted that the rate of rotation imparted to the gear 28 by the hydraulic motor 33 will be the same as that imparted to the gear 60' due to the servo-motor relation between the two.

The rate changer is adjusted by the wheel 53 and the supporting shaft for this hand wheel may be provided with a graduated dial 73 as indicated in Figure 9. This dial may be notched and provided with a stop 74 to limit the rotation of the hand wheel between the desired limits.

The hydraulic circuit by which the servo-valve controls rotation of the servo-motor is shown in Figure 10. The pump 32 has an intake 75 through which fluid is withdrawn from a reservoir 76, and an output 77 which is connected by branch lines 78 and 79 to ports 80 and 81 of a balancing valve 82. This valve also has a pair of ports 83 and 84 which are connected by channels 85 and 86 respectively to the motor ports 87 and 88. A freely shiftable plunger 89 is slidably mounted within the balancing valve and is provided with tapered ends for varying the resistance to flow through ports 83 and 84. The branch lines 78 and 79 have hydraulic resistances 90 and 91 serially arranged therein, the resistance 90 having a greater value than the resistance 91 and this may be in the proportion of three to one. Since the pump is connected to both of the motor ports the object of the resistances is to provide an initial pressure differentiation in the channels 85 and 86. The channel 86 supplies the fluid to the motor for uni-directional operation thereof while the channel 85 is connected to reservoir by the servo-valve.

Assuming the servo-valve to be closed and the pump to be running, the pressure in chamber 92 of the balancing valve would normally be less than the pressure in chamber 93 because the resistance 90 is greater than the resistance 91 and therefore would cause a greater pressure drop in the fluid flowing to port 80 of the balancing valve. This would cause the pressure to be greater in chamber 93. Since the plunger 89 is free to move, the unbalanced pressures acting on the ends thereof will cause the plunger 89 to shift toward the left and continue shifting until the pressures on each end equalize.

It will be apparent that as the plunger shifts toward the left, it would decrease the opening at port 83 and increase the opening at port 84 whereby more fluid could flow out of chamber 93, decreasing the pressure therein, and less fluid could flow out of chamber 92, increasing the pressure therein. The result will be that the plunger 89 will take up a position which will equalize the pressures in the two chambers and adjust the openings of ports 83 and 84, in such proportion that three times the quantity of fluid will flow through the port 84 than will flow through the port 83. The result is that the resistances 90 and 91 serve as means for dividing the flow among the channels 85 and 86 unequally, while the balancing valve automatically adjusts itself to balance or maintain this division of flow. By means of this arrangement, a definite back pressure can be maintained in the exhaust line from the motor and thus prevent the same from running away.

The channel 85 has branch connections 94 and 95 to diametrically opposite ports 96 and 97 formed in the servo-valve sleeve. The supply channel 86 also has branch connections 98 and 99 to ports 100 and 101 in the servo-valve sleeve. The sleeve is further provided with a pair of exhaust ports 102 and 103 which are connected to a return channel 104. The servo-valve spool 105 has two longitudinal extending grooves 106 and 107 which are diametrically opposite to one another for balancing purposes. The spool 105 is connected to the motor shaft 34. When the sleeve 62 is rotated in a counterclockwise direction, as viewed in Figure 10, the ports 96 and 97 are connected to the exhaust grooves 106 and 107 whereby fluid from the motor port 88 may discharge to reservoir to permit operation of the motor.

Rotation of the motor shaft 34 will be in such a direction as to cause the servo-valve spool 105 to also rotate in a counterclockwise direction and thereby tend to close the ports 96 and 97 and stop operation of the motor. It will be obvious from the mechanical hook-up shown in Figure 2 that the servo-valve will be continuously driven during operation of the pump 32, but at the lower feed rates the consumption of the motor will not be very great and there will be a tendency for the pressures in channels 85 and 86 to rise considerably. In order to prevent this, bleeder coils 108 and 109 are connected to channels 85 and 86 respectively so that there will be some flow from these channels to reservoir at all times. The outlets of these bleeder coils are connected to a common return line 110. For emergencies, the output channel 77 may be provided with a branch connection to an emergency relief valve 111.

Use is also made of the hydraulic pressure to shift the feed-rapid traverse determining clutch 27. As shown in Figure 10, this clutch is provided with a pivoted shifter fork 112 which is operatively connected to a piston 113 slidably mounted in a cylinder 114.

The opposite ends of this cylinder are connected by channels 115 and 116 to a reversing valve 117. This valve has a pair of pressure ports 118 and 119 which are supplied through channel 120 by the pump 32; and an exhaust port 121 which is connected to the return line 110. The reversing valve plunger 122 is normally held in the position shown by a spring 123, whereby the clutch 27 is held in a disengaged position whereby the gear 28 in Figure 2 is rotated at a feed rate. A manually operable control 124 is provided on the front of the machine and operatively connected through shaft 125 and pinion 126 to rack teeth 127 formed on the reversing valve plunger 122, whereby the plunger may be shifted against the resistance of spring 123 to effect rapid traverse rotation of the gear 28.

It will be obvious that the rapid traverse rotation will only continue as long as the operator holds the control 124 against the resistance of spring 123.

The manner in which the gear 28 is connected for power operation of the knee, saddle and table of the machine is shown in Figures 6 and 7 to which reference may now be had.

The gear 28 is connected through an intermediate idler 128 to a gear 129 which is connected to a splined shaft 130, as shown in Figure 6. A gear 131 integral with the gear 129 serves to drive the saddle and knee. The gear 131 rotates gear 132 which has integral therewith a gear 133 which is in direct mesh with a gear 134 and indirect mesh with gear 135, through intermediate idler gears 136 and 137. This results in the gears 134 and 135 rotating in opposite directions.

These gears are supported for free rotation on a saddle drive shaft 138 and have clutch teeth 139 on the opposing faces thereof for interengagement with complementary clutch teeth formed on opposite ends of a shiftable clutch 140 splined on the shaft 138. The shaft 138 drives the saddle lead screw 141 which is threaded through a nut 142 carried by the saddle. A screw 141 has one end journaled in anti-friction bearings 143 in the front of the knee and the other one fixed in a rotatable sleeve 144.

The gears 134 and 135 rotate gears 145 and 146 respectively in opposite directions and these gears are supported for free rotation on the drive shaft 147 for the knee elevating mechanism. The opposing faces of the gears are provided with clutch teeth for selective engagement by clutch teeth formed on opposite ends of a shiftable clutch member 148. The shaft 147 is connected by a beveled gear 149 to a beveled gear 150 which is integral with a nut 151 to which is threaded the knee elevating screw 152. When the clutch 148 is in a neutral position the beveled gear 150 may be manually rotated through conventional manual controls operatively connected thereto as by the beveled gears 153 and 154.

The table is actuated by the shaft 130 which has a long spline 155 upon which slides a beveled gear 156 rotatably mounted in a housing 157 which is integral with the saddle. Thus, the gear 156 may be rotated in spite of longitudinal adjustment of the saddle. The housing 157, as shown in Figure 7, carries a vertical shaft 158 which is rotated by beveled gear 159 intermeshing with the beveled gear 156. The upper end of the shaft is connected by a train of spur gearing, indicated generally by the reference numeral 160, to a beveled gear 161. This gear rotates a pair of bevel gears 162 and 163 in opposite directions, whereby they may be alternately connected by a shiftable clutch member 164 for rotation of a screw 165. The screw 165 constitutes the table lead screw and is threaded in a nut 166 which is fixed with the saddle. A manually operable handle 167 is supported on the reduced end of the screw and detachably connectible therewith for manual actuation of the screw.

There has thus been provided an improved transmission and control mechanism for a milling machine comprising a feed transmission and a rapid traverse transmission which is so compact in construction that it may be mounted on the machine in close relation to the parts to be operated, and so simple in design that selection of rate or variation in feed rate either up or down while cutting is in progress may be easily effected.

I claim:

1. In a milling machine having a column, a cutter spindle journaled in the column, a work supporting table, a knee carried by the column and supporting the table for two-directional movement relative to the cutter spindle, the combination of transmission means for effecting movement of the table, including a rotary hydraulic motor, a servo-control valve for the motor, a power train connecting the motor to the table, and means carried by the knee for actuating the servo-valve including a prime mover and a stepless rate changer for connecting the prime mover to the valve.

2. In a milling machine having a column, a table, saddle and knee supported by the column, the combination of transmission means for actuating the table, saddle and knee including a constantly driven high speed shaft journaled in the knee, a final driven gear, individual branch transmissions for the table, saddle and knee actuated by said gear, clutch means for directly connecting the high speed shaft for rotation of the gear, a feed transmission continuously driven by said shaft including hydraulic means for converting the high speed rotation of said shaft into variable low speed rotation of said gear and a single control carried by the knee for increasing or decreasing the output rate of said hydraulic means.

3. In a milling machine having a column, a knee, saddle and table supported by said column, the combination of transmission means for effecting movement of said parts relative to the column including a final drive gear, a prime mover mounted on the knee, a hydraulically coupled pump and motor, means connecting the prime mover for operation of the pump, means connecting the motor for actuation of said gear, and a parallel power driven connection between the pump and motor for determining the rate of rotation of the latter.

4. In a milling machine having a work support and a cutter spindle, the combination of transmission means for effecting movement of the work support transversely of the cutter spindle including a final gear, a power train connecting the gear for actuation of the work support, a hydraulic motor operatively connected for rotation of said gear, means for supplying fluid pressure to said motor, a prime mover, and means driven by the prime mover for effecting and controlling the rate of rotation of said motor.

5. In a milling machine having a column, a knee adjustably mounted on said column, a work support translatable relative to said knee, the combination of a transmission casing mounted on said knee, said casing containing a prime mover, a hydraulically coupled pump-motor unit, a servo-valve for the motor, a final gear operatively connected to the moving support, a first branch transmission actuated by the prime mover but driving said gear at a rapid traverse rate, a second branch transmission actuated by the prime mover for driving said servo-valve, said last-named transmission including an infinitely variable rate variator, and means connecting said pump for continuous actuation by the prime mover.

6. In a milling machine having a column, a knee vertically adjustable on said column, a saddle and table superimposed on said knee, the combination of transmission means carried by the knee for actuating said saddle and table including a servo-motor mechanism, a pump for supplying said motor, a prime mover for actuating said pump, a final gear, branch transmissions connecting said gear to the table and saddle respectively, a variable feed transmission unidirectionally driven by the prime mover for determining the feed rate of said servo-motor, a rapid traverse clutch for connecting the prime mover for direct actuation of said gear, and a feed clutch for connecting said motor for actuation of the gear, said last-named clutch being an overrunning clutch whereby the feed transmission is automatically rendered ineffective during rapid traverse actuation of the gear.

7. In a machine tool having a movable support, the combination of transmission means for effecting movement of the support, including a hydraulic motor, a gear train connecting said motor to the support, said motor having intake and exhaust ports, a pump having its delivery connected to both of said motor ports, means to divide the flow from said pump among said ports, a balancing valve for maintaining the division of flow, a servo-valve connected to said ports, a constantly driven variable transmission for actuating said servo-valve, and clutch means for connecting the gear train for actuation of the support.

8. In a transmission for a movable slide of a machine tool, the combination of a drive gear therefor, motion transmitting connections including a reverser for coupling the drive gear to the slide, means for actuating the drive gear at a relatively fast rate including a prime mover and a clutch for connecting the prime mover to the gear, means for actuating the drive gear at a feed rate including a rotary hydraulic motor, a pump, a rotary servo-valve for controlling the flow of fluid from said pump to said motor, means continuously driven by the prime mover for actuating the pump and servo-valve, and means for varying the rate of actuation of said servo-valve and thereby of said slide.

9. In a feed transmission for a milling machine, the combination with a movable support, of a drive gear connected for reversable actuation of said support, a hydraulic motor for unidirectionally rotating said gear, said motor having intake and exhaust ports, a pump, channel means connecting the output of said pump to both of said ports, said means including a flow divider and a balancing valve whereby differential pressures may be imposed on said motor, a servo-valve connected across said channels, said valve being operable to connect one of said channels to reservoir to cause operation of said motor, and a power driven stepless rate changer for actuating said valve, whereby the rate of actuation of said valve determines the rate of actuation of the movable support.

MARIO E. MARTELLOTTI.